UNITED STATES PATENT OFFICE.

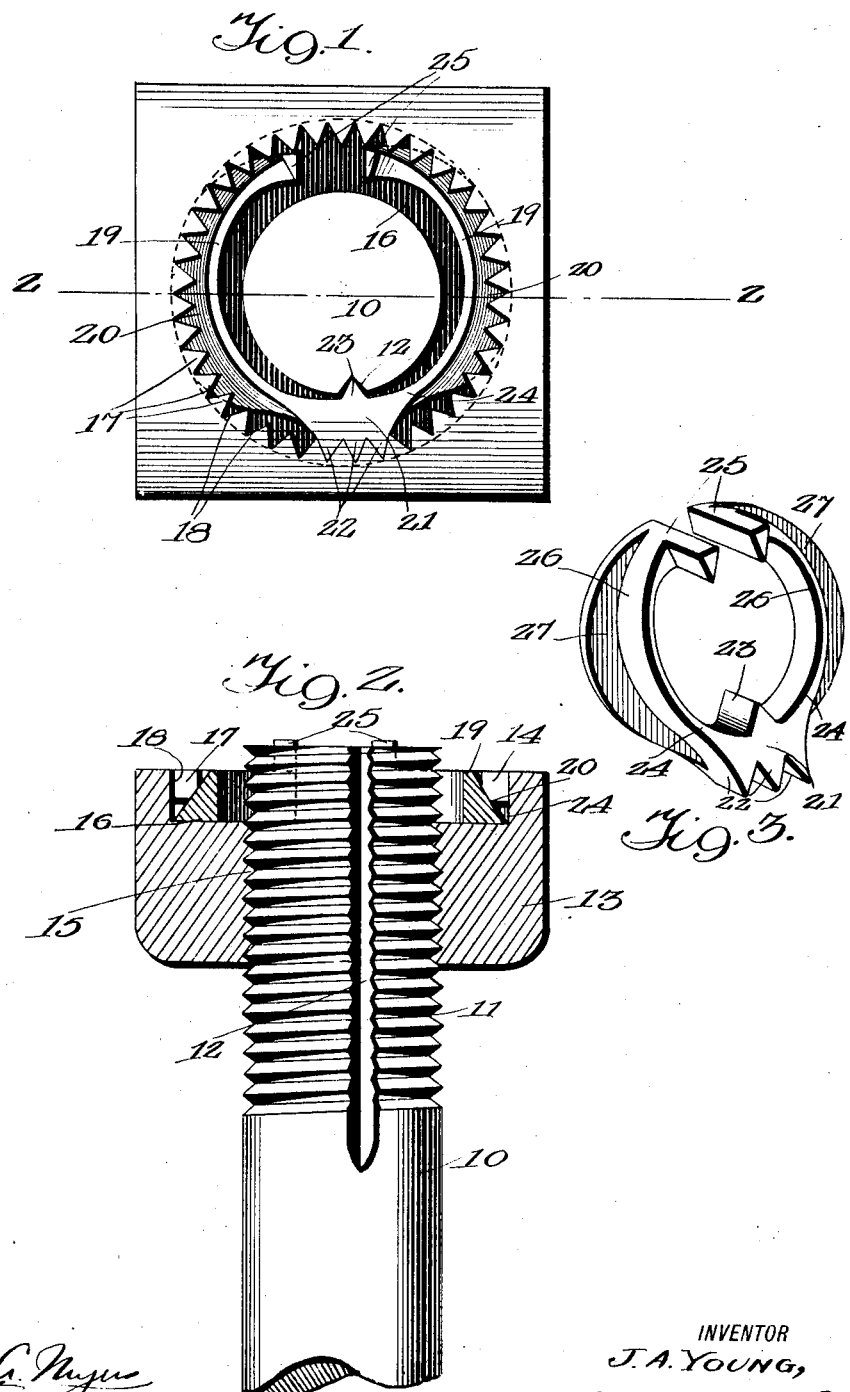

JOHN A. YOUNG, OF BELAIR, MARYLAND.

NUT-LOCK.

1,352,643.   Specification of Letters Patent.   Patented Sept. 14, 1920.

Application filed June 3, 1920. Serial No. 386,241.

*To all whom it may concern:*

Be it known that I, JOHN A. YOUNG, a citizen of the United States, and a resident of Belair, in the county of Harford, in the State of Maryland, have invented certain new and useful Improvements in Nut-Locks, of which the following is a specification.

This invention relates to nut locks or means for locking a nut on a bolt to prevent reverse rotation and displacement thereof, whereby certain parts assembled by the bolt will be held securely and safely in assembled relation and the device consists of a simple, durable and inexpensive arrangement for positively locking the nut on the bolt against turning and for permitting minute adjustment and convenient application and removal of the nut.

A further object of the invention is to provide an improved nut lock of that type in which the bolt is provided with a longitudinal groove or keyway and the nut is equipped with an annular recess or chamber circumscribing the threaded opening thereof and adapted to accommodate a locking means in the form of a split ring of novel and simple construction adapted to simultaneously engage the bolt and nut to prevent the later from turning on the former, while said ring is so formed as to facilitate its application and removal, to allow compensating movement between the parts so that the application of the ring is facilitated and so formed as to prevent accidental displacement of the split ring when in applied position.

Other and further objects of my invention will become readily apparent to persons skilled in the art, from a consideration of the following descrption when taken in conjunction with the accompanying drawings, wherein:—

Figure 1 is an end elevation of a bolt with a nut engaged thereon and equipped with the improved locking means, Fig. 2 is a diametrical sectional view taken on the line 2—2 of Fig. 1, and Fig. 3 is a perspective view of a modified form of split ring constituting a part of the locking means.

Referring to the drawings in detail, in which like reference characters designate corresponding parts throughout the several views, there is shown a bolt 10 having the threaded end 11 which is provided with a longitudinal groove or keyway 12 preferably of V-shaped cross section, with the bight portion disposed toward the axis.

The nut is designated at 13 and is provided in one of its faces with an annular recess or chamber 14 circumscribing the threaded bore 15 thereof and opening to the adjacent face of the nut. The end wall of the chamber 14 is preferably flat, as indicated at 16 and the annular or inner surface is provided with a series of alternate teeth or projections 17 and intervening V-shaped notches 18 which are arranged continuously around the chamber or recess at its circumscribing wall.

Engaged in the recess is a locking means in the form of a split ring 19 of substantially triangular cross section at the sides beyond an intermediate point opposite to the split portion or spaced ends of the ring. That is, the side portions are beveled downwardly and outwardly as indicated at 20 and at the intermediate portion there is provided a projection 21 extending radially outward and formed with a series of V-shaped teeth or projections 22, preferably three in number and arranged in an arcuate or rectilinear line or path to engage the corresponding notches 18 between the teeth or projections 17 at the outer wall of the nut chamber or recess. Intermediately of the projection 21 and the inside, is provided a tapered key or bit 23 which is engaged in the keyway or groove 12 when the parts are applied, and which is allowed compensating or relatively free limited movement therein from side to side in order to permit proper engagement of the teeth 22 with the notches 18 and facilitate application and removal of the ring.

It should be noted that the chamber or recess 14 is undercut as shown at 24, that is, extends beneath the teeth 17 so as to accommodate the beveled base edge of the split ring whereby the latter is held from displacement, the bottom edges of the teeth being preferably beveled also to conform to the cross section of the ring, if desired. As previously stated, the teeth 22 are formed at about the central portion of the ring with respect to the extremities thereof and between the thickened sides beveled as indicated at 20, thus producing relatively thin resilient portions 24 adjacent to each side of the enlargement 21 in order to permit proper flexing of the side portions at the extremity or end portion of each of which is provided a right angularly projecting lug 25 extending axially, so as to project from the face of the nut and furnish means for contracting the split ring whereby the same may be readily applied to the nut chamber or removed therefrom. Of course, it is to be understood that the ring is normally expanded and that when the lugs 25 at the extremities are released, the sides will spring outwardly beneath the teeth 17 so as to engage in the undercut annular recess 24 at the base portions of its beveled sides, thus preventing accidental displacement of the ring from its locking position. The teeth 22 will engage the notches 18, and the key 23 will engage the keyway 12 adjacent or opposite thereto, assuming that the nut has been turned and the parts held therebetween are properly clamped or engaged. As the teeth 17, notches 18, teeth 22, key 23 and keyway or groove 12 are all disposed axially, the parts may readily move into and out of engaged position, although the teeth 22 are preferably beveled slightly toward their outer ends to facilitate application and removal thereof. As the ring is preferably made of spring metal of suitable thickness to allow the necessary resiliency, and assumes a normal oval shape, it is obvious that the sides must be contracted in order to permit it to be applied, while still permitting its removal and positively insuring that it will be retained in place when allowed to expand. The device therefore furnishes a simple, inexpensive and effective locking means between the nut and bolt, to prevent displacement of the nut with resultant consequences.

In Fig. 3 of the drawings, a similar locking means is employed or illustrated, the construction of the sides of the ring being slightly modified in that said sides 26 are made of triangular, rectangular or other cross section and provided at their bottom or base portions with outwardly directed flanges 27 tapering toward their ends in conformity with the outer faces of the sides of the ring at the extremities and intermediate portion 21 thereof. These flanges are designed to extend beneath the teeth 17 in the undercut groove 24, so as to positively prevent displacement of the split locking ring when in applied position. The construction of the ring shown in Fig. 3 is otherwise the same as that shown in Figs. 1 and 2 of the drawings. It will also appear that very minute and accurate adjustments of the nut on the bolt can be obtained, the construction being such as to permit the adjustment to be conveniently made with or without the removal of the ring due to the manual or automatic action of the ring, though primarily intended to be manually displaced when the adjustment is made by contracting the same through the medium of the parts 25 by means of a suitable instrument or otherwise.

In view of the foregoing, it is thought that the operation of the device will be readily understood and in view of the simplicity and practical value that it will commend itself to those skilled in the art.

Having thus described my invention, what I claim is:—

1. An improved nut lock comprising in combination with a bolt having a longitudinal groove, a nut having an internally screw threaded opening to admit the bolt and also having an annular chamber on its inner face surrounding the bolt opening and ratchet teeth on the interior of said annular chamber, and a split ring having an inwardly tapering key to enter the groove of the bolt for limited lateral pivoting movement and having one or more teeth at its intermediate portion opposite to said key to engage the teeth of the nut, the end portions of the ring being provided with right angularly extended lugs to permit said ends to be contracted for applying and removing the ring.

2. A nut lock comprising the combination with a bolt having a longitudinal keyway and a nut having an annular chamber circumscribing its internally threaded opening for admitting the bolt, said chamber having teeth on its inner face and undercut beneath the same, and a split ring having a radially inwardly extended tapered key to engage said keyway and a plurality of outwardly extending teeth to engage the notches intervening the teeth of the nut chamber, the sides of the ring being adapted to extend into said undercut portion of the chamber to prevent displacement of the ring and the extremities of the ring being adapted to normally spring apart, and means whereby said extremities may be moved together for contracting the ring from a normal oval shape to permit said side portions to move free of the teeth of the nut chamber.

3. A nut lock comprising the combination with a bolt having a longitudinal groove and a nut engaged on the bolt and provided in one face with an annular recess forming a key-receiving chamber and provided at its circumscribing wall with ratchet teeth terminating at a spaced distance from the bottom face of the chamber, said bottom portion of the chamber being flat, and a locking key in the form of a split resilient metallic ring with a thickened intermediate portion and thin portions at either side thereof, said intermediate portion having oppositely projecting teeth for engagement with the notches of the nut chamber and an inwardly extended tapered key to engage the groove of the bolt for lateral play therein, the sides of the ring beyond said thin portions having outwardly extending base portions to engage the undercut of the nut chamber, said ring being normally expanded with its end portions spaced apart, and lugs projecting axially from said end portions for contracting the ring.

4. The combination with a bolt having a nut engaged thereon, said nut being provided with an undercut annular recess circumscribing the bore of the nut and the bolt; of locking means between the nut and bolt, said locking means comprising a split ring of resilient material having an intermediate portion reduced in thickness at either side, coöperative locking means between said intermediate portion and the inner wall of the recess to prevent independent movement of one with respect to the other, coöperative locking means between said intermediate portion and the bolt to allow limited movement therebetween, the side portions of the ring being of increased thickness and having bottom projections to engage the undercut portion of the recess to prevent displacement of the ring when expanded in applied position, said ring being normally of greater diameter than the diameter of the recess and provided at its extremities with parallel axially projecting lugs extending beyond the face of the nut for application of means to move the same toward each other or in contact for contracting the ring whereby to render the diameter thereof less than the diameter of the recess to permit application or removal of the ring.

JOHN A. YOUNG.